United States Patent [19]
Hanson

[11] Patent Number: 5,965,890
[45] Date of Patent: Oct. 12, 1999

[54] SOLID STATE INFRARED CHOPPER

[75] Inventor: Charles M. Hanson, Richardson, Tex.

[73] Assignee: Raytheon Company, Lexington, Mass.

[21] Appl. No.: 09/000,686

[22] Filed: Dec. 30, 1997

Related U.S. Application Data

[60] Provisional application No. 60/034,475, Jan. 2, 1997.
[51] Int. Cl.$^6$ ........................................................ G01J 5/06
[52] U.S. Cl. ........................ 250/350; 250/351; 359/245
[58] Field of Search .................................. 250/350, 351; 359/245, 568, 572, 573

[56] References Cited

U.S. PATENT DOCUMENTS

| | | | |
|---|---|---|---|
| 4,115,747 | 9/1978 | Sato et al. | 359/245 |
| 5,337,183 | 8/1994 | Rosenblatt | 359/254 |

*Primary Examiner*—Constantine Hannaher
*Assistant Examiner*—Darren M. Jiron
*Attorney, Agent, or Firm*—Baker & Botts, L.L.P.

[57] ABSTRACT

A chopper is provided of solid state construction. Two layers are provided adjacent one another with the area between the layers defining one or more diffusion zones. One or more voltage potentials may be applied across the second layer to correspond to the diffusion zones. At an initial state the voltage potentials are either zero or some predetermined value which causes the index of refraction of the two layers to be substantially the same. At a second state the voltage potential equals some predetermined value to cause the index of refraction of the second layer to be different from that of the first layer. The difference in index of refraction between the layers creates a diffraction grating in the respective diffusion zone to diffuse that portion of an incident signal passing through the diffusion zone.

23 Claims, 1 Drawing Sheet

SOLID STATE INFRARED CHOPPER

This application claims priority under 35 U.S.C. § 119 (e)(1) of provisional application no. 60/034,475, filed Jan. 2, 1997.

TECHNICAL FIELD OF THE INVENTION

This invention generally relates to signal choppers and, more particularly, to a solid state infrared chopper.

BACKGROUND OF THE INVENTION

Signal choppers are generally known and are typically used to either block an incident signal or change one or more characteristics of the incident signal so that its exit form is different than its entry form. One of many applications for choppers is for use in imaging systems. A typical imaging system includes a detector for detecting an incident signal produced by or reflected from a source. A chopper may be disposed between the incident signal and the detector to interrupt the signal before it reaches the detector.

Electrical choppers are generally known and have been used in imaging systems. One problem with electrical choppers, however, is that they cannot be used with thermal imaging systems because the thermal detector needs a thermal reference to provide successful chopping. Another problem with electrical choppers is the need for complex electronic circuitry in order to achieve chopping.

Thermal choppers are also generally known and are typically used in thermal imaging systems. The thermal chopper provides an intermediate object between a scene, which is the source of the signal, and the detector. In the thermal imaging system, the chopper provides a thermal reference for a thermal detector. Therefore, with respect to the portion of the signal being chopped the detector detects the thermal reference as opposed to the incident signal.

SUMMARY OF THE INVENTION

In accordance with the present invention, known disadvantages and problems associated with previous choppers have been addressed. The present invention provides a solid state chopper that efficiently changes the characteristics of a portion of an incident signal. The chopper can be used for any suitable chopping application including, but not limited to, imaging systems.

According to one embodiment, a solid state chopper is provided which includes first and second layers of different materials which are coupled together. One or more electrodes is coupled to the second layer for applying one or more corresponding voltage potentials across the second layer to create diffusion zones between the layers. According to one aspect, the first and second layers have substantially the same index of refraction. According to another aspect, the first and second layers have a different index of refraction which may be equalized by applying a predetermined first-state voltage potential across one of the layers.

According to another embodiment of the present invention, an imaging system is provided which includes a detector array for receiving an incident signal. A solid state signal chopper is positioned between the incident signal and the detection array.

One advantage of the present invention is that the chopper is a solid state device. It is an alternative to mechanical choppers and, therefore, avoids mechanical reliability problems.

Another advantage of the present invention is that it is smaller than conventional mechanical choppers, and it may be centered relative to the detector array, resulting in a smaller overall imaging system package.

BRIEF DESCRIPTION OF THE DRAWINGS

For a more complete understanding of the present invention, and the advantages thereof, reference is now made to the detailed description of the preferred embodiments in connection with the accompanying drawings, in which.

DETAILED DESCRIPTION OF THE INVENTION

The present invention provides a solid state chopper in which two layers of differing materials are bonded together. A voltage potential may be applied across one or both of the layers. At a first state the index refraction for both layers is substantially the same. This is achieved by using two layers having substantially the same index of refraction or by applying a voltage potential across at least one of the layers to alter its index of refraction so that it is substantially the same as the index of refraction of the other layer. At a second state, the index of refraction of one of the layers remains unchanged. However, a voltage potential across the other layer is either applied or adjusted so that the index of refraction of the other layer is changed to a value different than the index of refraction of the unchanged. This causes a diffusion zone to form in the region between the two layers which diffuses an incoming signal passing through the layers.

Figure 1:
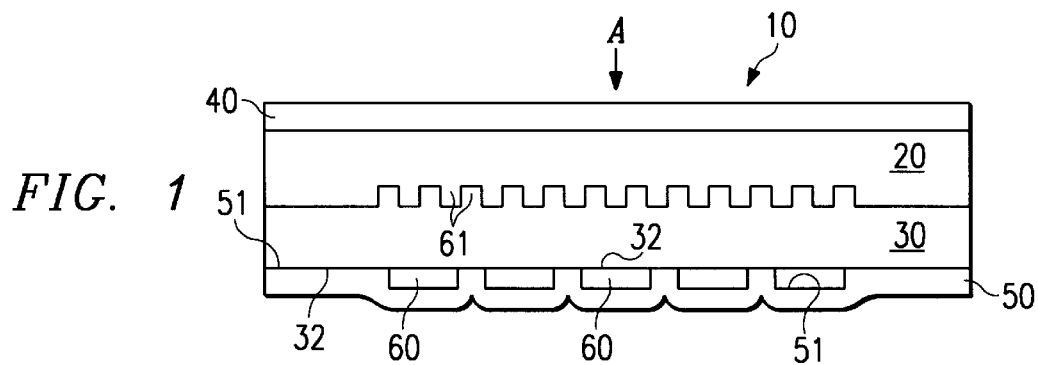
FIG. 1 is a cross-sectional view of a chopper in accordance with a first embodiment of the present invention.

As shown in greater detail in FIG. 1, chopper 10 comprises a first layer 20 and a second layer 30 which are coupled together. First layer 20 is formed from a first material having a first index of refraction. Second layer 30 is formed from a second material having a second index of refraction. Preferably, first layer 20 is formed from a ferroelectric material such as potassium dihydrogen phosphate, lithium tantalate, lead lanthanum zirconate titanate, lithium niobate or barium strontium titanate. First layer 20 may be doped so as to be electrically conductive. Preferably, second layer 30 is also formed from the same ferroelectric material, but is not doped.

First and second layers 20 and 30 may be formed separately and then coupled together using known optical material bonding techniques. Alternatively, either first or second layer 20 or 30 may be provided as a base or substrate and the other of the first and second layers may be deposited thereon using known material deposition techniques such as those used in forming integrated circuits. Layers may be deposited by a variety of known processes, including sol-gel, metal-organic decomposition, chemical vapor deposition, or physical vapor deposition.

Incident signal A is emitted from a source (not shown). The source may be, for example, an object which a viewer wishes to view by way of using an imaging system such as a thermal imaging system. In this case, signal A would be an infrared signal comprising infrared radiation emitted from the source. It should be noted that although chopper 10 is preferably used in conjunction with processing infrared signals, chopper 10 may be used to chop other signals such as those which exist in the visible spectrum. In the case of chopping visible signals, signal A might comprise, for example, a reflection of a beam of light initially directed to an object from another source (not shown). Although incident signal A is shown approaching chopper 10 from a certain direction, signal A may, in operation, approach chopper 10 from an angularly offset direction or from the opposite side of chopper 10.

Preferably, chopper 10 also includes a first anti-reflection layer 40 and a second anti-reflection layer 50 coupled to outer surfaces of first layer 20 and second layer 30, respectively. First and second anti-reflection layers 40 and 50 allow the passage of incident signal A without refraction, while eliminating or reducing reflection thereof. This ensures optimum efficiency of a device or system which incorporates chopper 10. First and second anti-reflection layers 40 and 50 may be deposited on first and second layers 20 and 30 by any suitable technique, such as sputtering or evaporation.

Figure 2:
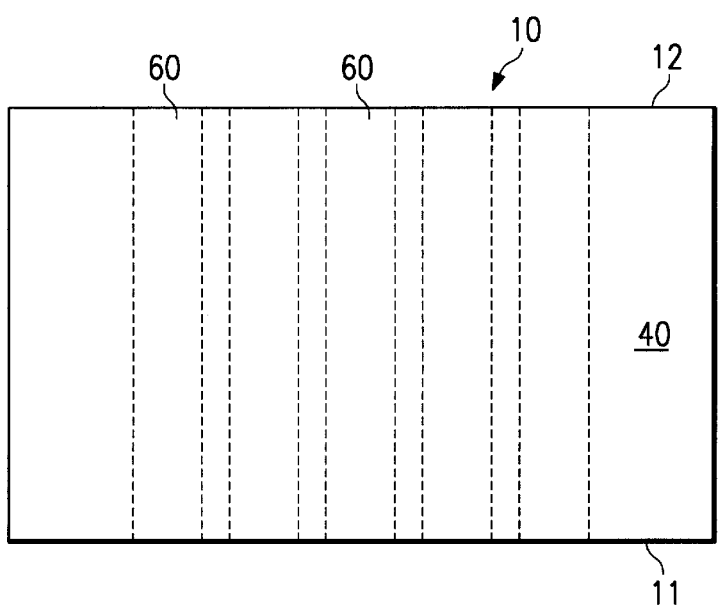
FIG. 2 is a plan view of the chopper depicted in FIG. 1.

Chopper 10 also includes a plurality of first electrodes 60, each of which corresponds to a diffusion zone 61 as described in greater detail below. As shown by dotted lines in FIG. 2, electrodes 60 preferably have a rectangular shape and extend from a first edge 11 to a second edge 12 of chopper 10. Preferably, electrodes 60 are planar and disposed between an outer surface 32 of second layer 30 and an inner surface 51 of second anti-reflection layer 50. As an example, five first electrodes 60 are shown. Preferably, however, chopper 10 includes as many first electrodes 60 as there are rows in the infrared detector array (not shown) with which chopper 10 may be used. Depending upon the application of chopper 10, one or more electrodes 60 may be used. Further, although electrodes 60 are shown as rectangular in shape and extend across a planar width of chopper 10, electrodes 60 may be any of a number of shapes including circles or squares and may be positioned in any desired pattern or randomly about the outer surface 32 of second layer 30. Preferably, each of first electrodes 60 is coupled to an electrical lead (not shown). The electrical leads in turn may be coupled to a power source (not shown) for activating first electrodes 60 to generate a plurality of voltage potentials across second layer 30. Preferably, first electrodes 60 are formed from transparent conductive materials such as indium tin oxide or from a very thin metal. This allows application of a plurality of voltage potentials across second layer 30 to change the index of refraction thereof without affecting the index of refraction of first layer 20. A plurality of first electrodes 60 permits switching the state of part of the solid state chopper without affecting other parts.

According to one aspect, the index of refraction of first layer 20 is substantially the same as the index of refraction of second layer 30. This characteristic allows passage of incident signal A through chopper 10 without diffraction or diffusion when none of the plurality of first electrode 60 is activated. According to an alternative aspect, the index of refraction of first layer 20 may be different than the index of refraction of second layer 30. In this case, incident signal A may pass through chopper 10 without diffraction or diffusion when the voltage potentials created by first electrodes 60 are at a proper predetermined value to alter the index of refraction of second layer 30 such that it is substantially equal to the index of refraction of first layer 20.

Preferably, each of the plurality of first electrodes 60 may be selectively activated to provide a respective corresponding voltage potential across second layer 30. Also, each of the plurality of first electrodes 60 is associated with a corresponding diffusion zone 61 between first and second layers 20 and 30. Preferably, each of the plurality of corresponding diffusion zones has a planar profile which substantially corresponds in shape to the planar shape of its respective, corresponding first electrode 60. When a first electrode 60 is activated, the index of refraction of second layer 30 is changed to create a diffraction grating within the diffusion zone corresponding to the activated first electrode 60.

Where the index of refraction for first layer 20 is substantially the same as that for second layers 30, a first state for a given diffusion zone is defined by the corresponding voltage potential applied to that diffusion zone being equal to zero. A second state is defined by a voltage potential of a predetermined value being applied across second layer 30 in the region corresponding to the given diffusion zone. Thus, each of the plurality of diffusion zones will have a corresponding first and second state. The first states will all be defined by the corresponding voltage potential being equal to zero. The second states will all be defined by the corresponding voltage potentials having a predetermined value. However, with respect to the plurality of voltage potentials which define the second states of the plurality of diffusion zones, it is preferable but not necessary for each of these voltage potentials to have the same predetermined value.

Where the index of refraction for first layer 20 is different from that of second layer 30, a first state for each of the plurality of diffusion zones is defined by a corresponding voltage potential being equal to a predetermined value which changes the index of refraction of the second layer 30 in each of the diffusion zones so that the index of refraction of second layer 30 equals the index of refraction of first layer 20. Therefore, a predetermined voltage at the first state equalizes the index of refraction of second layer 30 with that of first layer 20. In this situation, a second state of each of the plurality of diffusion zones is defined by a corresponding voltage potential having a predetermined value different from the value of the voltage potential in the first state.

In operation, incident signal A passes through first anti-reflection layer 40 without being reflected. Signal A further passes through first layer 20 and reaches the plurality of diffusion zones between first layer 20 and second layer 30. In those diffusion zones which the corresponding voltage potential is at its first state, signal A continues to pass through the respective diffusion zone without being diffracted, diffused or otherwise affected. Signal A then passes through second layer 30 and second antireflection layer 50 to exit from chopper 10. Thus, the exit form of signal A is substantially the same as its entry form. In those diffusion zones in which the corresponding voltage potential is in its second state, signal A is diffused by the diffraction grating produced by the difference in index of refraction between the first layer 20 and second layer 30 in the area corresponding to the respective diffusion zone. Thus, signal A is either prevented from passing through the diffusion zone or exits from chopper 10 in an altered form. For example, signal A may continue to pass through the diffusion zone, second layer 30 and second anti-reflection layer 50, but with characteristics measurably different from the characteristics of signal A as it entered chopper 10.

The diffusion zone shown in FIG. 1 is preferably a binary diffractive optical element defined by the interface between two materials having different refractive indices, each material having sub-wavelength ridges that penetrate into the surface of the other material. If the materials have the same refractive index, the diffractive optical element disappears because the two materials are optically indistinguishable. It should be noted that the diffractive optical element need not be binary. The interpenetrating ridges may be of other shapes depending upon the desired optical function.

Figure 3:
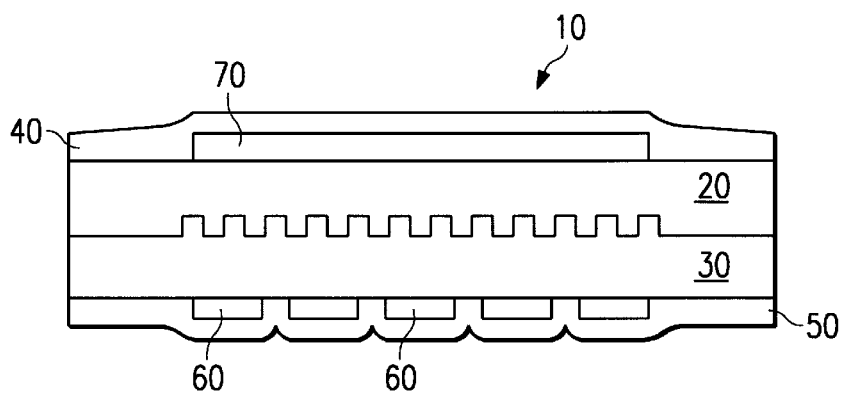
FIG. 3 is a cross-sectional view of a chopper in accordance with a second embodiment of the present invention.

According to a second embodiment of the present invention, and with reference to FIG. 3, chopper 10 also includes at least one second electrode 70 and first layer 20 in updoped form. In this case, the dependence of the index of refraction on electric field of the second layer 30 must differ substantially from that of first layer 20. Preferably, second electrode 70 is also formed from the same material as the plurality of first electrodes 60. Also, as shown in FIG. 3, second electrode 70 is a common electrode. In other words, second electrode 70 is common to all of first electrodes 60. As shown in FIG. 3, for example, second electrode 70 is common to each of first electrodes 60 because it extends perpendicular to and across the width of each of first electrodes 60. Preferably, second electrode 70 is coupled to first layer 20 in the same or similar fashion as first electrodes 60 are coupled to second layer 30. Preferably, second electrode 70 is disposed between first anti-reflection layer 40 and first layer 20. By forming first and second electrodes 60 and 70 from the same material as first layer 20, signal A is, at most, minimally affected by electrodes 60 and 70.

With respect to all embodiments of the signal chopper 10, first and second layers 20 and 30 each have a thickness between 0 and 30 microns. More preferably, the thickness of each layer is between 0.5 and 15 microns. Even more preferably, the thickness is between 1 and 5 microns. The voltage potentials applied at each diffusion zone in the second state are preferably between 1 and 100 volts. More preferably, the voltage potentials are between 1 and 20 volts. Even more preferably, the voltage potentials are between 1 and 10 volts.

Preferably the longitudinal centerlines of first electrodes 60 are spaced on the order of about 25 to 50 microns apart. Preferably there is a minimal gap between each of first electrodes 60. This gap should be on the order of about one micron. As stated previously, the dimensions in spacing of first electrodes 60 will depend upon the particular application for chopper 10 and the particular diffusion pattern desired.

Preferably, first electrodes 60 are coupled to a power source (not shown) in such a manner that they may be selectively activated in a predetermined sequence or a random order. Preferably, only one electrode 60 is activated at a time. Alternatively, two or more of electrodes 60 may be activated at the same time. Preferably, the unaltered index of refraction of the second layer 30 is on the order of about 2 to 2.5.

Figure 4:
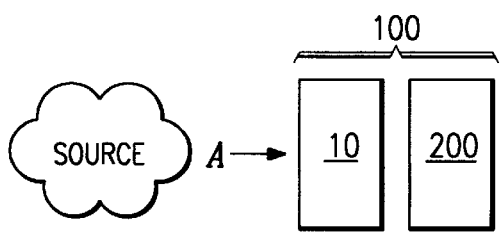
FIG. 4 is a schematic diagram of an imaging system incorporating a chopper in accordance with a third embodiment of the present invention.

In a third embodiment, and with further reference to FIG. 4, chopper 10 is incorporated into imaging system 100. Imaging system 100 includes a detector array 200 for receiving signal A. Imaging system 100 may be, for example, a thermal imaging system for detecting an infrared signal from a source to provide a thermal image of the source. Preferably, detector array 200 includes a plurality of thermal sensors which are arranged in rows and columns. Chopper 10 is disposed between the source and detector array 200 such that signal A passes through chopper 10 prior to reaching the thermal sensors of detector array 200. Preferably, a first electrode 60 corresponds to each of either the rows or columns of the thermal sensors of detector array 200. Therefore, when a given electrode 60 is activated to diffuse signal A in its corresponding diffusion zone, signal A is prohibited from reaching the respective row or columns of thermal sensors of detector array 200 without being altered. As previously described, signal A may be prevented from reaching detector array 200 or may be diffused so that the corresponding row or column of thermal sensors senses a diffused signal. First electrodes 60 are preferably sequentially activated to provide sequenced chopping for detector array 200. The need for signal chopping in an imaging system is generally known and, therefore, a detailed description thereof is omitted.

The present invention has been described in connection with the preferred embodiments which are intended as examples only. It will be understood by those having ordinary skill in the pertinent art that modifications to the preferred embodiments may be easily made without materially departing from the scope and spirit of the present invention as defined by the appended claims.

What is claimed is:

1. A chopper for chopping an incident signal, the chopper comprising:
   a first layer of a first material;
   a second layer of a second material, the first layer coupled to the second layer;
   a plurality of first electrodes coupled to the second layer for applying a plurality of corresponding voltage potentials across the second layer to create a plurality of corresponding diffusion zones between the first and second layers.

2. The chopper of claim 1, the second layer being disposed between the first layer and the plurality of first electrodes.

3. The chopper of claim 1, the first layer having a first index of refraction and the second layer having a second index of refraction, wherein when one of the voltage potentials is at a first state the first index of refraction is substantially equal to the second index of refraction, and wherein changing the one of the voltage potentials to a second state changes the second index of refraction to create a corresponding one of the diffusion zones.

4. The chopper of claim 3 wherein the incident signal is an optical signal, and wherein when the one of the voltage potentials is in the first state, a corresponding region of the first and second layers is adapted to allow the optical signal to pass therethrough without diffusion.

5. The chopper of claim 4 wherein the optical signal is an infrared signal, and wherein when the one of the voltage potentials is in the first state, a corresponding region of the first and second layers is adapted to allow the infrared signal to pass therethrough without diffusion.

6. The chopper of claim 1, wherein at least one of the corresponding diffusion zones comprises a diffraction grating created between the first and second layers, the diffraction grating diffusing the incident signal.

7. The chopper of claim 1 further comprising at least one second electrode, the second electrode being common to more than one of the plurality of first electrodes, the second electrode comprising the first material, the first and second layers being disposed between the second electrode and the plurality of first electrodes.

8. The chopper of claim 1 further comprising an anti-reflection layer coupled to at least one of the first and second layers for allowing passage of the incident signal without reflection.

9. The chopper of claim 1 wherein at least one of the plurality of first electrodes comprises the first material.

10. The chopper of claim 1 wherein at least one of the corresponding diffusion zones comprises a diffractive optical element between the first and second layers.

11. The chopper of claim 10 wherein the diffractive optical element comprises interpenetrating ridges between the first and second layers.

12. The chopper of claim 10 wherein the diffractive optical element comprises a binary diffractive optical element.

13. A method for chopping a signal comprising:

providing a first layer of a first material;

coupling a second layer of a second material to the first layer; and applying a plurality of voltage potentials across the second layer to create a plurality of corresponding diffusion zones between the first and second layers.

14. The method of claim 13 wherein the step of applying a plurality of voltage potentials comprises selectively applying the plurality of voltage potentials in a predetermined sequence.

15. The method of claim 13 further comprising:

passing the signal through the first layer;

passing the signal through at least one of the diffusion zones to diffuse the signal; and passing the diffuse signal through the second layer.

16. The method of claim 13 wherein the first material has a first index of refraction and the second material has a second index of refraction, the method further comprising applying a plurality of first voltage potentials across the second layer to equalize the second index of refraction with the first index of refraction, and wherein the step of applying a plurality of voltage potentials comprises applying a plurality of second voltage potentials to change the second index of refraction.

17. The method of claim 13 further comprising passing the signal through an anti-reflection layer prior to passing the signal through the first layer.

18. The method of claim 13 further comprising passing the diffuse signal through an anti-reflection layer after passing the diffuse signal through the second layer.

19. An imaging system for receiving a signal, the system comprising:

a detector having an array of sensors; and a chopper associated with the detector, the chopper comprising:

a first layer of a first material;

a second layer of a second material, the first layer coupled to the second layer;

a plurality of first electrodes coupled to the second layer for applying a plurality of corresponding voltage potentials across the second layer to create a plurality of corresponding diffusion zones between the first and second layers.

20. The imaging system of claim 19, wherein the array is arranged in rows and columns of the sensors, wherein a portion of the signal is diffused by the chopper before the signal is received by the detector.

21. The imaging system of claim 20, wherein at least one diffusion zone corresponds to a row or column of sensors in the array, and wherein the portion of the signal passing through the at least one diffusion zone is diffused before being received by the corresponding row or column of sensors.

22. The imaging system of claim 19, wherein at least one diffusion zone corresponds to a plurality of the sensors, and wherein the portion of the signal passing through the at least one diffusion zone is diffused before being received by the corresponding plurality of sensors.

23. The imaging system of claim 19, the first layer having a first index of refraction and the second layer having a second index of refraction, wherein when one of the voltage potentials is at a first state the first index of refraction is substantially equal to the second index of refraction, and wherein changing the one of the voltage potentials to a second state changes the second index of refraction to create a corresponding one of the diffusion zones.

* * * * *